United States Patent [19]
Yagi et al.

[11] Patent Number: 5,195,038
[45] Date of Patent: Mar. 16, 1993

[54] THROTTLE PREDICTIVE CONTROLLER IN AUTOMATIC ENGINE TESTER

[75] Inventors: Hiroyuki Yagi, Yokohama; Youshi Ishii, Tokyo; Takashi Hashizume, Yokohama, all of Japan

[73] Assignee: Ono Sokki Co., Ltd., Tokyo, Japan

[21] Appl. No.: 533,404

[22] Filed: Jun. 5, 1990

[30] Foreign Application Priority Data

Jun. 7, 1989 [JP] Japan .................. 1-143009

[51] Int. Cl.$^5$ .................. G01L 3/22; G01L 3/14
[52] U.S. Cl. .................. 364/431.05; 364/424.1; 364/425; 364/579; 364/551.01; 73/116; 73/117; 73/862.18
[58] Field of Search ........... 364/431.01, 431.03, 364/426.04, 425, 579, 580, 424.01, 424.1, 431.05, 550, 551.01; 73/117.1, 117.2, 117.3, 862.09, 862.13, 862.16, 862.18, 862.08, 116, 117, 123, 125-127, 862.041, 865.9, 866.1, 866.2

[56] References Cited

U.S. PATENT DOCUMENTS

| | | | |
|---|---|---|---|
| 4,442,708 | 4/1984 | Gable et al. ............... | 73/117 |
| 4,457,182 | 7/1984 | McFarland ............... | 73/862.18 |
| 4,466,294 | 8/1984 | Bennington et al. ........ | 73/862.13 |
| 4,478,090 | 10/1984 | McFarland ............... | 73/862.09 |
| 4,656,576 | 4/1987 | Kawarabayashi ........... | 73/862.08 X |
| 4,680,959 | 7/1987 | Henry et al. ............. | 73/117 |
| 4,758,967 | 7/1988 | Shmuter et al. ........... | 364/579 X |
| 4,833,612 | 5/1989 | Okuno et al. ............. | 364/426.04 |
| 4,936,403 | 6/1990 | Morimoto ................ | 364/426.04 X |
| 4,939,657 | 7/1990 | Imai et al. ............... | 364/426.04 |
| 5,060,176 | 10/1991 | Nawa et al. .............. | 364/579 |
| 5,078,008 | 1/1992 | Yagi et al. ............... | 73/117 |
| 5,119,304 | 6/1992 | Seki ..................... | 364/431.05 |

OTHER PUBLICATIONS

SAE Paper 840347, J. Koustas and N. Watson, "A Transient Diesel Test Bed With Direct Digital Control", pp. 43–58, Dec. 1988.

*Primary Examiner*—Parshotam S. Lall
*Assistant Examiner*—Thomas S. Auchterlonie
*Attorney, Agent, or Firm*—Jacobson, Price, Holman & Stern

[57] ABSTRACT

Throttle predictive controller in an engine tester includes an operation pattern generator (5); an operational processing unit (4) consisting of a throttle predictive angle calculation part (1), a throttle angle-corresponding to acceleration calculation part (2) and an adder (3); a dynamometer controller (6); a throttle amplifier (9); a throttle actuator (10); a dynamometer (11); and a tachometer (12). The operation pattern generator inputs a set revolution speed signal (n) to the throttle predictive angle calculation part, the throttle angle-corresponding to acceleration calculation part and the throttle amplifier, and inputs a set torque signal (T) to the throttle predictive angle calculation part and the dynamometer controller. The dynamometer controller controls dynamometer torque coupled to an output shaft S of an engine being tested, and is connected to a revolution pickup (12) for the shaft to input a dynamometer actual revolution speed signal during the operation of the engine; the dynamometer controller is further connected to input an actual dynamometer torque signal and a dynamometer actual revolution speed signal at the time of operation of the engine to the throttle predictive angle calculation part, and the throttle amplifier is connected to input the actual throttle angle signal to the throttle predictive angle calculation part which in the operational processing unit prepares a map on the basis of the actual number of revolutions, the actual torque and the actual throttle angle.

8 Claims, 3 Drawing Sheets

THROTTLE PREDICTIVE CONTROLLER IN AUTOMATIC ENGINE TESTER

BACKGROUND OF THE INVENTION

1. Field of the Invention

This invention relates to a throttle predictive controller in an automatic engine tester.

2. Description of the Prior Art

Feedback control has been employed primarily in throttle angle control in an automatic engine tester in accordance with the prior art technique.

The throttle angle control by the feedback control by the prior art technique described above involves the drawbacks in that unstability of throttle angle is likely to occur due to disturbance or the like during a steady state and particularly because a throttle angle corresponding to an acceleration at the time of acceleration/deceleration is not taken into consideration, controllability such as delay of a transient operation is low. Therefore, this control method is not suitable for the performance test of engines such as their exhaust gas, fuel cost, and so forth.

SUMMARY OF THE INVENTION

One type of a throttle predictive controller in an engine tester in accordance with the present invention comprises an operation pattern generator; an operational processing unit consisting of a throttle predictive angle calculation part, a throttle angle-corresponding to acceleration calculation part and an adder; a dynamometer controller; a throttle amplifier; a throttle actuator; a dynamometer; and a tachometer; and wherein the operation pattern generator is connected in such a manner as to input a set revolution speed signal to the throttle predictive angle calculation part, to the throttle angle-corresponding to acceleration calculation part and to the throttle amplifier, and to input a set torque signal to the throttle predictive angle calculation part and to the dynamometer controller; the dynamometer controller is connected to the dynamometer in such a manner as to control a dynamometer torque for the dynamometer coupled to an output shaft of a tested engine, and is further connected to a revolution pickup disposed on the output shaft S of the tested engine so as to input a dynamometer actual revolution speed signal during the operation of the tested engine; the dynamometer controller is further connected in such a manner as to input an actual dynamometer torque signal and a dynamometer actual revolution speed signal at the time of operation of the tested engine to the throttle predictive angle calculation part; the throttle amplifier is connected in such a manner as to input the actual throttle angle signal to the throttle predictive angle calculation part; the throttle predictive angle calculation part in the operational processing unit prepares a map on the basis of the actual revolution speed, the actual torque and the actual throttle angle and stores the map, the throttle angle calculated from the map and the throttle angle calculated from the set revolution speed change component by the throttle angle-corresponding to acceleration calculation part are added by the adder, and this operational processing unit is connected in such a manner as to input the added throttle angle signal to the throttle amplifier; and throttle amplifier is connected in such a manner as to input an amplification signal to the throttle actuator so as to actuate the throttle of the tested engine to the angle based on the inputted throttle angle signal; and the throttle actuator is coupled to the throttle of the tested engine.

Another type of the throttle predictive controller of the present invention comprises an operation pattern generation portion; an operational processing unit consisting of a throttle predictive angle calculation part, a throttle angle-corresponding to acceleration calculation part and an adder; a car speed conversion portion; a throttle amplifier; a change controller; a throttle actuator; a change actuator; and a revolution pickup; and wherein the operation pattern generator is connected in such a manner as to input a set car speed signal to the throttle predictive angle calculation part, to the throttle angle-corresponding to acceleration calculation part and to the throttle amplifier and to input a set change position signal to the throttle predictive angle calculation part and to the change controller; the change controller is connected in such a manner as to control the change actuator on the basis of the set change position signal from the operation pattern generator; the change actuator is coupled to a transmission of a tested engine, is controlled by the change controller and operates the transmission; the revolution pickup detects the car speed of the tested car and is connected in such a manner as to input its car speed pulse signal to the car speed conversion portion; the car speed conversion portion is connected in such a manner as to input the car speed signal based on the car speed pulse signal to the throttle predictive angle calculation part; the throttle predictive calculation part in the operational processing unit prepares a map on the basis of the throttle angle calculated from the set car speed and the set change position and stores the map, the throttle angle calculated from the map and the throttle angle calculated from the set car speed change component are added, and the operational processing unit is connected in such a manner as to input the added throttle angle signal to the throttle amplifier; the throttle amplifier is connected in such a manner as to input the inputted throttle angle signal to the throttle actuator; and the throttle actuator is coupled to the throttle of the engine of the tested car so as to actuate the throttle to the angle based on the inputted throttle angle signal.

Furthermore, the dynamometer actual revolution speed signal or the actual car speed signal is inputted to the throttle amplifier of the throttle predictive controller of both types, and the throttle amplifier is equipped with the error correction controller for making the error correction control of the difference between the set revolution speed or the set car speed and the dynamometer actual revolution speed or the actual car speed, and with an adder, so that the correction throttle angle from the error correction controller is added further to the sum of the throttle angle calculated from the map and the throttle angle corresponding to the acceleration.

In the case of the control by the revolution speed-torque of the tested engine, the torque—throttle angle map for each revolution speed is prepared before the control.

To this end, the dynamometer control is set to a revolution speed control having a constant revolution speed or in other words, the revolution speed is set to a constant value on the basis of the set revolution speed signal from the operation pattern generator. The tested engine is then operated and the throttle is opened gradually. The increase change of the torque is first started during the increase in the throttle angle and the throttle angle at this point is determined. This throttle angle and the torque at this point are sampled with the revolution speed. Then, slowdown of the increase in the torque starts and the throttle angle at this point is determined. This throttle angle and the torque at this point are sampled with the revolution speed.

In this manner the portion between both points of time is divided equally into a plurality of time zones and the throttle angle and the torque at each intermediate point are likewise sampled with the revolution speed.

Further, similar sampling is conducted at the point when the throttle is fully open.

Sampling of the throttle angle, torque and revolution speed described above is carried out by changing variously the set value of the revolution speed, and each sample data is inputted to the dynamometer controller and to the throttle predictive angle calculation part of the operational processing unit from the throttle amplifier. It is also inputted to the throttle predictive calculation part from the dynamometer controller.

In the throttle predictive angle calculation part, the torque—throttle angle diagram is drawn and superposed for each revolution speed on the basis of these inputted sample data. In this manner the map of the revolution speed—torque—throttle angle is prepared and is then stored.

During the automatic operation, the throttle predictive angle calculation part of the operational processing unit calculates the throttle angle corresponding to the set revolution speed and set torque signals inputted from the operation pattern generator from the map.

At the time of the preparation of the operation pattern, the throttle angle corresponding to the angular acceleration of the revolution of the tested engine E is calculated by the throttle angle-corresponding to acceleration calculation part with the preparation of the revolution speed—torque—throttle angle map.

The acceleration calculation described above may be made during the automatic operation of the engine E but not at the time of the preparation of the operation pattern.

At the time of the automatic operation, the adder of the operational processing unit adds the throttle angle corresponding to the set revolution speed and the set torque signal to the throttle angle corresponding to the angular acceleration and the sum is inputted to the throttle amplifier.

The added value of both throttle angles is added to the correction throttle angle corresponding to the error correction control component of the difference between the set revolution speed and the actual revolution speed by the adder in order to eliminate the error of the revolution speed that remains when the control is made by use of the added value of both throttle angles as the target value of the throttle amplifier. The sum of these three throttle angles becomes the final throttle angle set value.

The throttle actuator actuates the throttle of the tested engine so as to attain the throttle angle based on the final throttle angle set value signal inputted from the throttle amplifier.

In the case of the control in accordance with each transmission change position and car speed of the tested car, on the other hand, the car speed—throttle angle map for each transmission change position of the tested car is prepared before the control.

To this end, the change actuator is controlled by the change controller on the basis of the set change position signal from the operation pattern generator, and actuates the transmission of the tested car. After the change position of the transmission of the tested car is thus set to an arbitrary set position, the throttle angle is kept at an arbitrary value and the tested car is operated for driving. The car speed at the point when it gets stable is determined and the throttle angle and car speed at that point are sampled with the set change position. Such a sampling is repeated for several to some dozens of throttle angles at variously changed positions and the car speed at these points under the same change position condition.

Sampling described above is effected for all the change positions and each of the sample data is inputted to the car speed convertor, to the throttle amplifier and to the throttle predictive angle calculation part of the operational processing unit from the operation pattern generator.

In the throttle predictive angle calculation part, the car speed—throttle angle diagram calculated by the least square approximation curves or the like on the basis of the inputted sample data is drawn and superposed for each change position. In this manner the change position—car speed—throttle angle map is prepared and stored.

During the automatic operation, the throttle angle in accordance with the set car speed inputted from the operation pattern generator and set change position is calculated from the map described above and outputted.

Before the control and at the time of the preparation of the operation pattern, the throttle angle corresponding to the acceleration of the tested car is calculated with the preparation of the car speed—change position—throttle angle map.

The throttle angle corresponding to the acceleration of the tested car and the operation of the throttle actuator are the same as those of the control of the revolution speed and torque of the tested engine described already.

The above and other objects and novel features of the present invention will become more apparent from the following description when taken in conjunction with the accompanying drawings.

DESCRIPTION OF THE PREFERRED EMBODIMENTS

Hereinafter, some preferred embodiments of the present invention will be described with references to the accompanying drawings.

Figure 1:
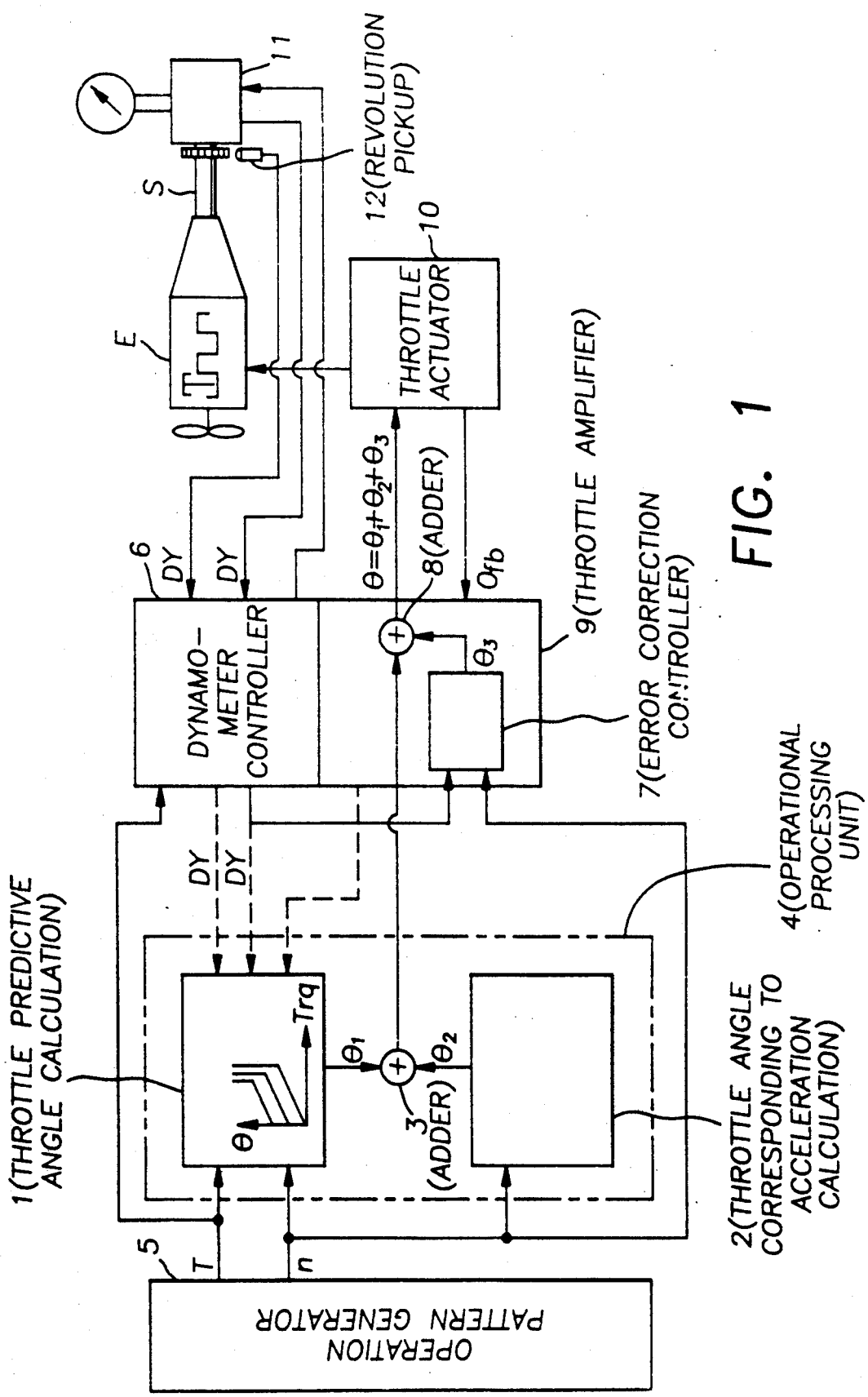
FIG. 1 is a structural block diagram of a throttle predictive controller in accordance with the first embodiment of the present invention.

The throttle predictive controller of the first embodiment shown in FIG. 1 is of the type which is applied to an engine tester of an automatic operation apparatus on an engine bench type. This throttle predictive controller comprises an operational processing unit 4 consisting of a throttle predictive angle calculation part 1, a throttle angle-corresponding-to-acceleration calculation part 2 and an adder 3, an operation pattern generator 5, a dynamometer controller 6, a throttle amplifier 9 equipped with an error correction controller 7 and an adder 8, a throttle actuator 10, a dynamometer 11 and a revolution pickup 12.

The operation pattern generator 5 is connected in such a manner as to input a set revolution speed signal to the throttle predictive calculation part 1, the throttle angle-corresponding-to-acceleration calculation part 2 and the error correction controller 7 of the throttle amplifier 9 and to input a set torque signal T to the throttle predictive angle calculation part 1 and the dynamometer controller 6. The dynamometer controller 6 is connected to the dynamometer 11 in such a manner that an actual dynamometer signal at the time of operation of a tested engine E is inputted from the dynamometer 11 coupled to the output shaft S of the tested engine E and feedback control is made so that the actual dynamometer torque at the time of operation of the tested engine E reaches the set torque. It is further connected to the revolution pickup 12 provided to the output shaft S of the tested engine E so that a dynamometer actual revolution speed signal at the time of operation of the tested engine E is also inputted.

Furthermore, the dynamometer controller 6 is connected so that the actual dynamometer torque signal and the dynamometer actual revolution speed signal at the time of operation of the tested engine E are inputted to the throttle predictive angle calculation part 1 and so that the dynamometer actual revolution speed signal is inputted to the error correction controller 7 of the throttle amplifier 9.

In the calculation processing unit 4, the throttle angle $\theta_1$ (map component) calculated from the set revolution speed and the set torque in the throttle predictive angle calculation part and the throttle angle $\theta_2$ (angular acceleration component) calculated from the set revolution speed change component in the throttle angle calculation part 2 are added by the adder 3, and the calculation processing unit 4 is connected to the throttle amplifier 9 so as to input the added throttle angle signal $\theta_1 + \theta_2$.

In the throttle amplifier 9, the error correction control for the difference between the set revolution speed and the actual revolution speed is made by the error correction controller 7 and the resulting throttle angle $\theta_3$ is added to the throttle angle signal $\theta_1 + \theta_2$ by the adder 8. Furthermore, the throttle amplifier 9 is connected to the throttle actuator 10 so as to effect the feedback control using the resulting throttle angle signal $\theta_1 + \theta_2 + \theta_3$ as the set value. The throttle actuator 10 is connected to the throttle in such a manner as to operate the throttle of the tested engine E to the angle based on the inputted throttle angle signal $\theta_1 + \theta_2 + \theta_3$.

The operation and function of the throttle predictive controller of the first embodiment described above will now be explained.

(1) Before the control, a torque (T)—throttle angle ($\theta$) map for each revolution speed of the tested engine E is prepared.

To this end the dynamometer control is set to the revolution speed control at a constant revolution speed or in other words, the revolution speed n is set to a constant value on the basis of the set revolution speed signal from the operation pattern generator 5. Then, the tested engine E is operated and the throttle is opened gradually. The increase change of the torque T is first started during the increase of the throttle angle $\theta$ at that point (A) is determined. The throttle angle $\theta$ and the torque at that point are sampled with the revolution speed n. Next, the gradual drop of the increase in the torque T is started and the throttle angle $\theta$ at that point (B) is determined. The throttle angle $\theta$ and the torque T at that point are sampled with the revolution speed n.

In this manner, the portion between the points (A) and (B) is divided into a plurality of sections and the throttle angle $\theta$ and the torque T at each intermediate point are likewise sampled with the revolution speed n.

Figure 2:
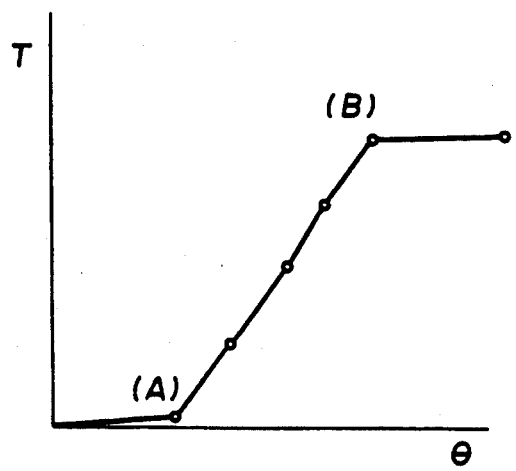
FIG. 2 is a graph explanatory of data sampling of throttle angle—torque—revolution speed in the first embodiment of the present invention.

Furthermore, similar sampling is carried out at the point where the throttle is fully open (see FIG. 2).

Sampling of the throttle angle $\theta$, the torque T and the revolution speed n is carried out by changing variously the set value of the revolution speed n and each sample data is inputted from the dynamometer controller 6 and the throttle amplifier 9 to the throttle predictive angle calculation part 1 of the operational processing unit 4.

In the throttle predictive calculation part 1, the torque (T)—throttle angle ($\theta$) diagram, which is calculated by least square approximation lines or the like on the basis of the inputted sampling data is drawn and superposed for each revolution speed. In this manner the map of the revolution speed (n)—torque (T) is prepared and stored.

(2) At the time of the automatic operation, the throttle angle $\theta_1$ corresponding to the set revolution speed and the set torque signal inputted from the operation pattern generator 5 is calculated from the map described above in the throttle predictive angle calculation part 1.

The maps of $n_1$ and $n_2$ that interpose the set revolution speed $n_{SET}$ are selected.

Points A and B on $n_1$ and points C and D on $n_2$ interposing the set torque $T_{SET}$ are selected.

$\theta_1$ can be determined from the throttle angles $\theta_A$ and $\theta_B$ at points A and B in accordance with the following equation:

$$\theta_1 = \theta_A + (\theta_B - \theta_A)\cdot(T_{SET} - T_A)/(T_B - T_A)$$

Similarly, $\theta_2$ can be determined from the throttle angles $\theta_C$ and $\theta_D$ at the points C and D in accordance with the following equation:

$$\theta_2 = \theta_C + (\theta_D - \theta_C)\cdot(T_{SET} - T_C)/(T_D - T_C)$$

Figure 3:
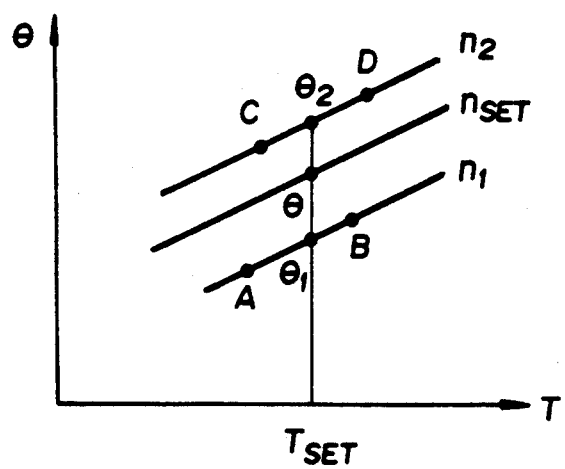
FIG. 3 is a graph explanatory of calculation of the throttle angle in the first embodiment of the present invention.

$\theta$ can be determined from $\theta_1$ and $\theta_2$ given above:

$$\theta = \theta_1 + (\theta_2 - \theta_1) \cdot (n_{SET} - n_1)/(n_2 - n_1) \text{ (see FIG. 3)}$$

(3) The throttle angle-corresponding to acceleration calculation part 2 calculates the throttle angle corresponding to the angular acceleration of the revolution of the tested engine E at the time of the preparation of the operation pattern with the preparation of the revolution speed (n)—torque (T)—throttle angle ($\theta$) map.

In other words, the angular acceleration $\alpha_i$(rad/S$^2$) at each step i is determined from the difference between the set revolution speed $n_i$ at each step of the operation pattern inputted from the operation pattern generator 5 and the revolution speed $n_{i-1}$ of the adjacent step:

$$\alpha_i = k\cdot(n_i - n_{i-1})/t$$

where
- k: conversion coefficient ($2\pi/60$)
- $n_i$: revolution speed at each step (rpm)
- $n_i - n_{i-1}$: revolution speed of one step (rpm)
- t: gap between steps (s).

The engine torque T necessary for obtaining such an angular acceleration is expressed by the following equation:

$$T = j\alpha$$

where
- j: inertial mass of engine and dynamometer (kg·m·S²)

The throttle angle $\theta_2$ (%) corresponding to the angular acceleration can be obtained from this torque and the set revolution speed by use of the revolution speed (n)—torque (T)—throttle angle ($\theta$) map described above.

The calculation described above may be effected during the automatic operation of the engine E instead of at the time of the operation pattern preparation.

(4) During the automatic operation, the throttle angle $\theta_1$ corresponding to the set revolution speed and to the set torque signal and the throttle angle $\theta_2$ corresponding to the angular acceleration are added by the adder 3 of the calculational processing unit 4 and are inputted to the throttle amplifier 9.

(5) In order to eliminate the error of the revolution speed that remains when control is made by use of the sum of the throttle angle $\theta_1$ and the throttle angle $\theta_2$ as the reference value of the throttle amplifier 9, the error correction controller 7 makes the error correction control between the set revolution speed and the actual revolution speed and the throttle angle $\theta_3$ corresponding to the error correction control component as the difference between the set revolution speed and the actual revolution speed is added to the sum described above by the adder 8. The sum of these three, i.e., $\theta_1 + \theta_2 + \theta_3$, is used as the set value of the final throttle angle and the throttle actuator is subjected to the feedback control.

(6) The throttle actuator 10 actuates the throttle of the tested engine E so as to attain the throttle angle based on the final throttle angle set value signal $\theta_1 + \theta_2 + \theta_3$ inputted from the throttle amplifier 9.

Figure 4:
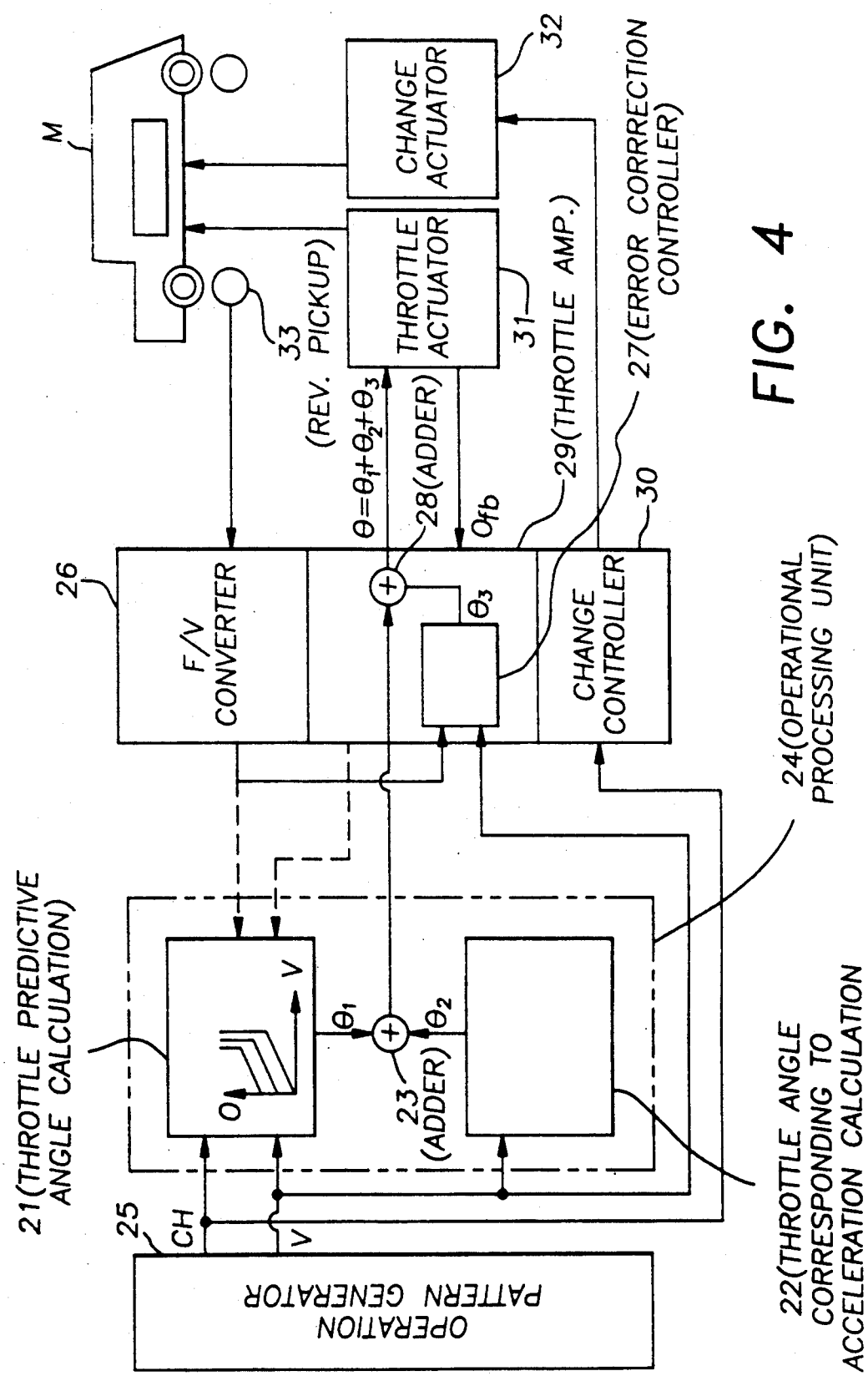
FIG. 4 is a structural block diagram of the throttle predictive controller in accordance with the second embodiment of the present invention.

The throttle predictive controller of the second embodiment shown in FIG. 4 is one of the type which is applied to an engine tester of an automatic operation apparatus on a chassis dynamometer type, and comprises an operational processing unit 24 consisting of a throttle predictive angle calculation part 21, throttle angle-corresponding to acceleration calculation part 22 and an adder 23, an operation pattern generator 25, a F/V convertor 26, a throttle amplifier 29 equipped with an error correction controller 27 and an adder 28, a change controller 30, a throttle actuator 31, a change actuator 32 and a revolution pickup 33.

The operation pattern generator 25 is connected so that a set car speed signal V is inputted to the throttle predictive angle calculation part 21, the throttle angle-corresponding to acceleration calculation part and so the error correction controller 27 of the throttle amplifier 29 and that the set change position signal is inputted to the throttle predictive angle calculation part 21 and the change controller 30.

The change controller 30 is connected so as to control the change actuator 32 on the basis of the set change position signal from the operation pattern generator 25 and the change actuator 32 is connected to a transmission so that it is controlled by the change controller 30 and operates the transmission of the tested car M.

The revolution pickup 33 detects the car speed of the tested car M from the driving wheel and inputs its car speed pulse signal to the F/V convertor 26. The F/V convertor 26 is connected so as to input the car speed signal on the basis of the car speed pulse signal to the throttle predictive calculation part 21 and to the error correction controller 27 of the throttle amplifier 29.

In the operational processing unit 24, the throttle angle $\theta_1$ (map component) calculated from the set car speed and from the set change position by the throttle predictive angle calculation part 21 and the throttle angle $\theta_2$ (acceleration component) calculated from the set car speed change component by the throttle angle-corresponding to acceleration calculation part 22 are added by the adder 23, and the operational processing unit 24 is connected to the throttle amplifier 29 so as to input the throttle angle signal $\theta_1 + \theta_2$ as the sum.

In the throttle amplifier 29, the error correction control is made for the difference between the set car speed and the actual car speed by the error correction controller 27 and the throttle angle $\theta_3$ obtained at this time is added to the throttle angle signal $\theta_1 + \theta_2$ by the adder 28. The throttle amplifier 29 is connected to the throttle actuator 31 so as to make the feedback control by use of the throttle angle signal $\theta_1 + \theta_2 + \theta_3$ as the result of addition as the set value. The throttle actuator 31 is connected to the throttle so as to actuate the throttle of the tested car M to the angle based on the inputted throttle angle signal $\theta_1 + \theta_2 + \theta_3$.

Next, the operation and function of the throttle predictive controller of the second embodiment described above will be explained.

(1) Before the start of the control, a car speed (V)—throttle angle ($\theta$) map is prepared for each transmission change position of the tested car.

To this end, the change actuator 32 is controlled by the change controller 30 on the basis of the set change position signal from the operation pattern generator 25 and actuates the transmission of the tested car M. After the change position CH of the transmission of the tested car M is set to an arbitrary position in this manner, the throttle angle $\theta$ is kept at an arbitrary value and then the tested car M is driven so as to determine the car speed V at the point of time where it gets stable. The throttle angle $\theta$ and the car speed V at this point are sampled together with the set change position CH.

Such sampling is repeated at the same change position CH for the throttle angles $\theta$ of several to some dozens of points that are changed variously, and for each car speed at these points.

Sampling described above is effected for all the change positions CH and each sample data is inputted to the F/V convertor 26, to the throttle amplifier 29 and to the throttle predictive angle calculation part 21 of the operational processing unit 24 from the operation pattern generator 25.

In the throttle predictive calculation part 21, a car speed (V)—throttle angle ($\theta$) diagram calculated from least square approximation curves on the basis of these sample data or the like is drawn and superposed for each change position CH to prepare a change position (CH)—car speed (V)—throttle angle ($\theta$) map. This map is stored.

(2) During the automatic operation, the throttle angle $\theta_1$ corresponding to the set car speed $V_{SET}$ and set change position $CH_{SET}$ inputted from the operation pattern generator 25 is calculated from the map described above and is outputted.

(3) Before the start of the control, the throttle angle corresponding to the acceleration/deceleration speed of the tested car M is calculated at the time of the preparation of the operation pattern together with the preparation of the car speed (V)—change position (CH)—throttle angle ($\theta$) map.

In other words, the acceleration/deceleration speed $\alpha_i$(m/s$^2$) at each step is determined from the difference between the set car speed $V_i$ at each step of the operation pattern and the car speed $V_{i-1}$ of the adjacent step:

$$\alpha_i = k \cdot (V_i - V_{i-1})/t$$

where k: conversion coefficient
$V_i$: car speed (km/h) at each step
$V_{i-1}$: car speed before one step (km/h)
t: gap between steps (s).

The engine torque T necessary for obtaining the acceleration/deceleration speed can be expressed by the ratio of the maximum torque at that car speed in accordance with the following equation:

$$T = j\alpha/T_{MAX}(V) \cdot 100$$

where $j = (k/g) \cdot (W/R(s)^2 + \Delta W)$
j: inertial moment of car (kgm/s$^2$)
g: gravitational acceleration (m/s$^2$)
w: car weight (kg)
$\Delta W$: weight corresponding to rotating portion
R(s): total gear ratio
s: change position
k: conversion coefficient
$T_{MAX}(n)$: maximum torque at car speed V (kgm)
T: engine torque necessary for obtaining acceleration (%)

The throttle angle $\theta_2$ (%) corresponding to the acceleration/deceleration is obtained from this torque ratio.

For example, $\theta_2 = k \cdot T$.

The calculation described above may be effected during the automatic operation of the tested car M instead of the time of preparation of the operation pattern.

(4) During the automatic operation, the throttle angle $\theta_1$ corresponding to the set car speed and set change position and the throttle angle $\theta_2$ (%) corresponding to the acceleration/deceleration are added by the adder 23 of the operational processing unit 24 and the sum is inputted to the throttle amplifier 29.

(5) In order to remove the error of the car speed that remains when the control is made by use of the sum of the throttle angle $\theta_1$ and the throttle angle $\theta_2$ as the reference value of the throttle amplifier 29, the error correction controller 27 makes the error correction control for the difference between the set car speed and the actual car speed and the throttle angle $\theta_3$ corresponding to the error correction component for the difference between the set car speed and the actual car speed is added to the sum described above by the adder 28, and the throttle actuator is subjected to the feedback control by use of the sum of these three, i.e. $\theta_1 + \theta_2 + \theta_3$, as the set value of the final throttle angle.

The throttle actuator 31 actuates the throttle of the engine of the test car M so as to attain the throttle angle based on the final throttle angle set value signal $\theta_1 + \theta_2 + \theta_3$ inputted from the throttle amplifier 29.

In the engine tester either of the automatic operation apparatus on the engine bench type or of the automatic operation apparatus on the chassis dynamometer type, the automatic operation is effected and the engine test of the car is carried out while each throttle predictive controller controls and actuates the throttle.

In the embodiment of the invention for the automatic engine tester on the engine bench type, the throttle predictive control is made while the throttle angle $\theta_1$ (map component) calculated from the set revolution speed and set torque by the throttle predictive calculation part 1, the throttle angle $\theta_2$ (angular acceleration component) calculated from the set revolution speed change component by the throttle angle-corresponding to acceleration calculation part 2 and the throttle angle $\theta_3$ for the error correction control for the difference between the set revolution speed and the actual revolution speed by the error correction controller 7 are added together. In the embodiment of the invention for the engine tester of the automatic operation apparatus on the chassis dynamometer type, the throttle angle $\theta_1$ (map component) calculated from the set car speed and set change position by the throttle predictive angle calculation part 21, the throttle angle $\theta_2$ (acceleration component) calculated from the set car speed change component by the throttle angle-corresponding to acceleration calculation part 22 and the throttle angle $\theta_3$ for the error correction control for the difference between the set car speed and the actual car speed by the error correction controller 27 are added together and the throttle predictive control is carried out. In both of these types, it is possible to omit, in some cases, any of the throttle angle-corresponding to acceleration calculation part, its adder, the error correction controller and its adder, or the control circuit of any of them and to omit any of the throttle angles $\theta_2$ and $\theta_3$ so as to make the control.

In accordance with the throttle predictive controller of this invention, the map of the throttle angle under each operating condition is prepared and stored and the predictive control is effected on the basis of the map. Accordingly, response to the change of the operational conditions is high, delay and overshoot at the time of transient operation are less and the number of feedback elements is small.

Moreover, the preparation of the throttle angle map is made directly by the throttle predictive controller by operating the tested engine itself or the tested car itself. Therefore, the difference of individual tested objects does not affect at all, to say nothing of the difference between the theoretical values and the actual values.

Furthermore, the throttle angle corresponding to the angular acceleration/deceleration speed of the revolution of the tested engine or to the acceleration/deceleration speed of the tested car is calculated and added and the throttle angle is controlled on the basis of the addition result.

Therefore, throttle control performance is extremely high and accurate and remains high even in the transient operation. As a result, performance tests of the exhaust gas, fuel cost, etc., of the engine or the car can be carried out highly accurately.

In addition, control accuracy can be further improved because the correction throttle angle for the error correction control component for the difference between the set values and actual values of the revolution speed and the car speed are also taken into consideration.

We claim:

1. A throttle predictive controller in an engine tester, comprising:
    an operation pattern generator;
    an operational processing unit equipped with a throttle predictive angle calculation part;
    a dynamometer controller;
    a throttle amplifier;
    a throttle actuator;
    a dynamometer; and
    a revolution pickup for detecting the speed of revolution of an output shaft on an engine being tested and emitting a signal in response to said speed;
    said operation pattern generator being connected to input a set revolution speed signal to said throttle predictive angle calculation part and to said throttle amplifier, and to input a set torque signal to said throttle predictive angle calculation part and to said dynamometer controller;
    said dynamometer controller being connected to said dynamometer for controlling a dynamometer torque for said dynamometer coupled to said output shaft of said engine, and said dynamometer controller being connected to said revolution pickup to receive a dynamometer actual revolution speed signal from said pickup at the time of operation of said engine;
    said dynamometer controller being further connected to input an actual dynamometer torque signal and a dynamometer actual revolution speed signal at the time of operation of said engine to said throttle predictive angle calculation part;
    said throttle amplifier being connected to input an actual throttle angle signal to said throttle predictive angle calculation part;
    said throttle predictive angle calculation part preparing and storing a map based on said actual revolution speed, said actual torque and said actual throttle angle, and being further connected to input a throttle angle signal calculated from said map to said throttle amplifier;
    said throttle amplifier being connected to input an amplification signal to said throttle actuator for actuating a throttle of said engine to an angle based on said inputted throttle angle signal from said throttle predictive angle calculation part; and
    said throttle actuator being connected to said throttle of said engine.

2. A throttle predictive controller in an engine tester as claimed in claim 1, wherein said throttle amplifier further comprises:
    an error correction controller for making error correction control for the difference between a set revolution speed and dynamometer actual revolution speed; and
    an adder to which is inputted said dynamometer actual revolution speed signal and the correction throttle angle from said error correction controller for adding to said throttle angle.

3. A throttle predictive controller in an engine tester, comprising:
    an operation pattern generator;
    an operational processing unit comprising a throttle predictive angle calculation part, a throttle angle-corresponding to acceleration calculation part and an adder;
    a dynamometer controller;
    a throttle amplifier;
    a throttle actuator;
    a dynamometer; and
    a revolution pickup for detecting the speed of revolution of an output shaft on an engine being tested and emitting a signal in response to said speed;
    said operation pattern generator being connected to input a set revolution speed signal to said throttle predictive angle calculation part, to said throttle angle-corresponding to acceleration calculation part and to said throttle amplifier, and to input a set torque signal to said throttle predictive angle calculation part and to said dynamometer controller;
    said dynamometer controller being connected to said dynamometer for controlling a dynamometer torque for said dynamometer coupled to said output shaft of said engine, and said dynamometer controller being connected to said revolution pickup for inputting an actual dynamometer signal and a dynamometer actual revolution speed signal at the time of operation of said engine to said throttle predictive angle calculation part;
    said throttle amplifier being connected to input an actual throttle angle signal to said throttle predictive angle calculation part;
    said throttle predictive angle calculation part preparing and storing a map on the basis of an actual revolution speed, an actual torque and an actual throttle angle;
    said adder of said operational processing unit adding the throttle angle calculated from said map to the throttle angle calculated from a set revolution speed change component by said throttle angle-corresponding to acceleration calculation part to produce an added throttle angle signal, and being connected to input said added throttle angle signal to said throttle amplifier;
    said throttle amplifier being connected to input an amplification signal to said throttle actuator for actuating a throttle of said engine to an angle based on said inputted added throttle angle signal; and
    said throttle actuator being connected to said throttle of said engine.

4. A throttle predictive controller in an engine tester as claimed in claim 3, wherein said throttle amplifier further comprises:
    an error correction controller for making error correction control for the difference between a set revolution speed and dynamometer actual revolution speed; and
    an adder to which is inputted said dynamometer actual revolution speed signal and the correction throttle angle from said error correction controller for adding to said throttle angle.

5. A throttle predictive controller in a tester for a car having an engine, comprising:
    an operation pattern generator;
    an operational processing unit equipped with a throttle predictive angle calculation part;
    a car speed converter unit;
    a throttle amplifier;
    a change controller;
    a change actuator;
    a chassis dynamometer;

a throttle actuator; and a revolution pickup for detecting car speed from the speed of revolution of a driving wheel of the car being tested on said chassis dynamometer and emitting a pulse signal in response to said speed;

said operation pattern generator being connected to input a set car speed signal to said throttle predictive angle calculation part and to said throttle amplifier, and to input a set change position signal to said throttle predictive angle calculation part and to said change controller;

said change controller being connected to said change actuator to control said change actuator on the basis of said set change position signal from said operation pattern generator;

said change actuator being connected to a transmission of a car being tested for actuating said transmission;

said revolution pickup detecting the car speed being connected to input said car speed pulse signal to said car speed converter unit;

said car speed converter unit being connected to input a car speed signal based on said car speed pulse signal to said throttle predictive angle calculation part;

said throttle amplifier being connected to input an actual throttle angle signal to said throttle predictive angle calculation part;

said throttle predictive angle calculation part calculating a throttle angle from an actual car speed, and actual throttle angle and said set change position signal, and preparing and storing a map on the basis of said calculation and being connected to input a throttle angle signal calculated from said map to said throttle amplifier;

said throttle amplifier being connected to input an amplification signal to said throttle actuator for actuating a throttle of an engine of said car being tested to an angle based on said inputted throttle angle signal; and said throttle actuator being connected to said throttle of said engine.

6. A throttle predictive controller as claimed in claim 4, wherein said throttle amplifier further comprises:

an error correction controller for making error correction control for the difference between the set car speed and the actual car speed; and an adder to which is inputted said actual car speed and the correction throttle angle from said error correction controller for adding to said throttle angle.

7. A throttle predictive controller in a tester for a car having an engine, comprising:

an operation pattern generator;

an operational processing unit comprised of a throttle predictive angle calculation part, a throttle angle-corresponding to acceleration calculation part and an adder;

a car speed converter unit;

a throttle amplifier;

a change controller;

a chassis dynamometer;

a throttle actuator;

a change actuator; and a revolution pickup for detecting car speed from the speed of revolution of a driving wheel of the car being tested on said chassis dynamometer and emitting a pulse signal in response to said speed;

said operation pattern generator being connected to input a set car speed signal to said throttle predictive angle calculation part, to said throttle angle-corresponding to acceleration calculation part and to said throttle amplifier and to input a set change position signal to said throttle predictive angle calculation part and to said change controller;

said change controller being connected to said change actuator to control said change actuator on the basis of said set change position signal from said operation pattern generator;

said change actuator being connected to a transmission of a car being tested for actuating said transmission;

said revolution pickup detecting the car speed being conencted to input said car speed pulse signal to said car speed converter unit;

said car speed converter unit being connected to input a car speed signal based on said car speed pulse signal to said throttle predictive angle calculation part;

said throttle amplifier being connected to input an actual throttle angle signal to said throttle predictive angle calculation part;

said throttle predictive angle calculation part calculating a throttle angle from an actual car speed, an actual throttle angle and said set change position signal and preparing and storing a map on the basis of said calculation;

said adder of said operational processing unit adding the throttle angle calculated from said map and the throttle angle calculated from a set car speed change component by said throttle angle-corresponding to acceleration calculation part to produce an added throttle angle signal, and being connected to input said added throttle angle signal to said throttle amplifier;

said throttle amplifier being connected to input an amplification signal to said throttle actuator for actuating a throttle of an engine of said car being tested to an angle based on said inputted added throttle angle signal; and said throttle actuator being connected to said throttle of said engine of said car being tested.

8. A throttle predictive controller as claimed in claim 7, wherein said throttle amplifier further comprises:

an error correction controller for making error correction control for the difference between the set car speed and the actual car speed; and an adder to which is inputted said actual car speed and the correction throttle angle from said error correction controller for adding to said throttle angle.

* * * * *

UNITED STATES PATENT AND TRADEMARK OFFICE
CERTIFICATE OF CORRECTION

PATENT NO. : 5,195,038
DATED : March 16, 1993
INVENTOR(S) : Hiroyuki Yagi et al.

It is certified that error appears in the above-identified patent and that said Letters Patent is hereby corrected as shown below:

In the Drawings:

In Fig. 4, in the block numbered 21, change "O" to --$\theta$--.

Signed and Sealed this

Fourteenth Day of June, 1994

Attest:

BRUCE LEHMAN

Attesting Officer     Commissioner of Patents and Trademarks